July 13, 1948.   W. T. GRACE ET AL   2,445,112
METHOD FOR FORMING SO₂ BY BURNING SULFUR
Filed Dec. 28, 1940                              2 Sheets-Sheet 1
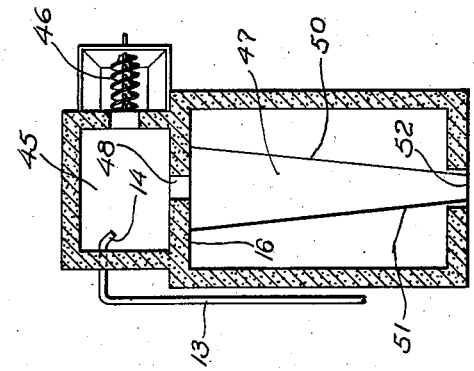
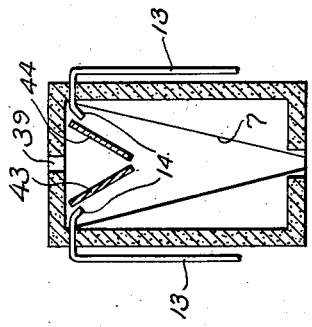
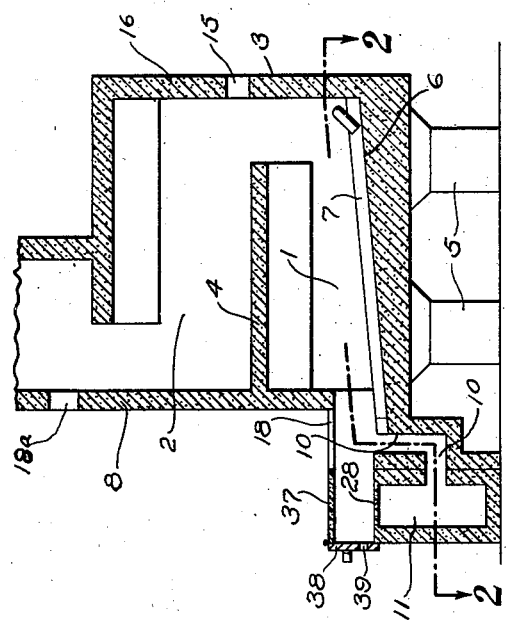
Worthington T. Grace
Joseph C. Muller, Jr.
INVENTOR
BY George T. Johnmeser
ATTORNEY July 13, 1948.   W. T. GRACE ET AL   2,445,112
METHOD FOR FORMING SO₂ BY BURNING SULFUR
Filed Dec. 28, 1940   2 Sheets-Sheet 2
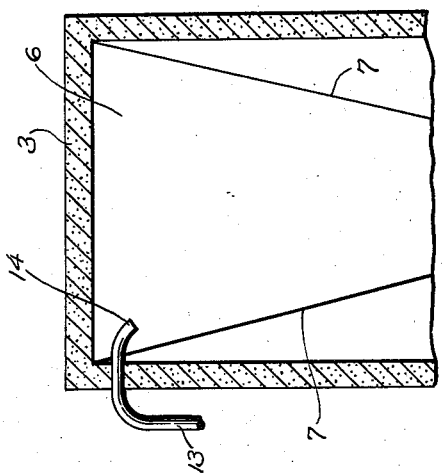
Fig. 2
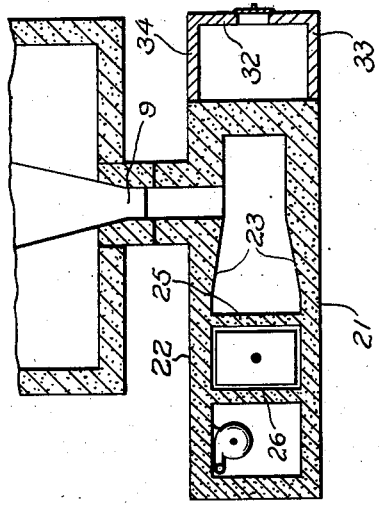
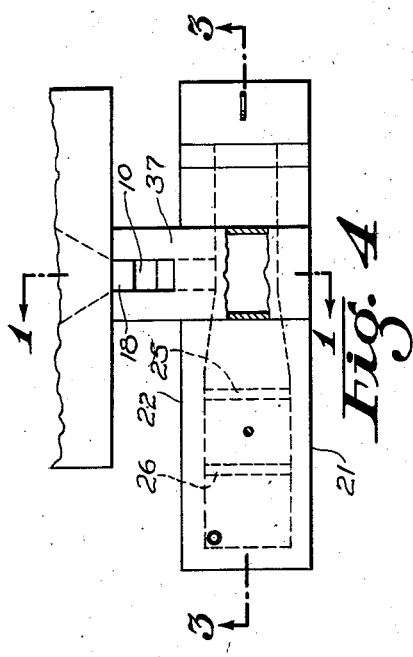
Fig. 4
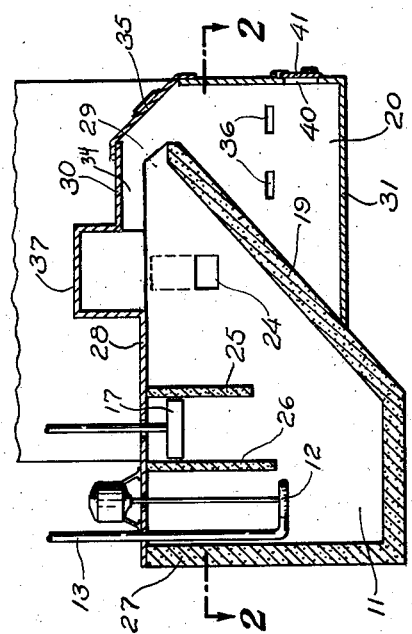
Fig. 3
Worthington T. Grace
Joseph C. Muller, Jr.
INVENTOR
BY George T. Johannesen
ATTORNEY Patented July 13, 1948

2,445,112

UNITED STATES PATENT OFFICE 2,445,112

METHOD FOR FORMING SO₂ BY BURNING SULFUR

Worthington T. Grace, Upper Darby, Pa., and Joseph C. Muller, Jr., Little Falls, N. J., assignors to E. I. du Pont de Nemours & Company, Wilmington, Del., a corporation of Delaware Application December 28, 1940, Serial No. 372,076

9 Claims. (Cl. 23—179)

This invention relates to the manufacture of sulfur dioxide and is particularly directed to sulfur burners and methods of burning sulfur in which high-temperature-fluent sulfur is continuously circulated through a volatilization chamber whereby sulfur is vaporized and residue is continuously swept from the volatilization zone. One of the simplest and least expensive types of brimstone burners used for the production of sulfur dioxide gas is the so-called brick or pan type burner. This burner consists essentially of a rectangular brick lined iron pan over which is a brick combustion chamber. The solid brimstone is fed into one end of the pan continuously by means of a screw where it is melted by the heat of the burner. Usually the pan is kept filled with molten sulfur.

This type of burner has two serious defects which interfere with the uniformity of operation. First, the ash and dirt present in the brimstone gradually accumulate in the pan and periodically the sulfur in the pan must be "burned out" and the accumulated ash removed. This interrupts operations for several hours. Attempts to remove the ash currently have been made but the results were not satisfactory because the agitation of the surface of the molten sulfur by the rakes causes fluctuations in the strength of the sulfur dioxide gas. Second, brimstone contains a small amount of oil or organic matter which forms an asphaltic-like material in the burner. This material floats on the surface of the molten sulfur, prevents volatilization of sulfur, and reduces the area of burning surface. Any disturbance of this blanket on the surface of the molten sulfur results in a sudden increase in the strength of sulfur dioxide gas. Both the ash and the floating material interfere seriously with the maintenance of a uniform quantity of uniform strength sulfur dioxide gas so essential to good operation of continuous sulfuric acid processes.

We have now found that these disadvantages can be avoided and separation of dirt and ash from the molten sulfur easily effected by continuously withdrawing high-temperature-fluent sulfur from the volatilization zone, separating impurities therefrom, and returning it to the volatilization zone. We have found particularly that if high-temperature-fluent sulfur is returned to the volatilization zone and fed on to an inclined hearth with addition of raw sulfur as required to compensate for that volatilized, the dirt and ash is continuously swept from the volatilization zone and may be separated from the sulfur in any suitable apparatus, as for example a settling pit.

Suitable apparatus for carrying out the processes of our invention are illustrated in the accompanying drawing in which Figure 1 is a side elevation in section; Figure 2 is a plan view in section taken along lines 2—2, Figure 1; Figure 3 is a front elevation in section along lines 3—3, Figure 4; Figure 4 is a plan view of Figure 2; Figure 5 is a plan view showing a modified form of the hearth illustrated in Figure 2; and Figures 6 and 7 are plan views showing further modifications of the hearth shown in Figure 2, claimed in our copending application 416,512 filed October 25, 1941.

The sulfur burner, as illustrated in Figure 1, is generally similar to the usual pan type burners and consists generally of a volatilization chamber 1 and a combustion chamber 2 defined in the brick housing 3 by the arch partition 4.

The bottom of the burner, which is supported on any suitable supporting structure 5, is arranged as an inclined plane sloping from the rear of the burner to the front at a suitable slope, say about 1 to 12. This arrangement provides a sloping hearth 6 down which molten sulfur is adapted to flow in a shallow stream so as to prevent accumulations of residue on the hearth. The hearth is provided with side walls 7 which, as illustrated in Figure 2, are arranged so that the sloping hearth 6 has a progressively decreasing area to prevent any pockets in which dirt and ash could accumulate.

The front wall 8 of the furnace is provided with a centrally located opening 9 which serves as an air port and also as an exit port for the high-temperature-fluent sulfur. The latter flows from the hearth 6 thru the conduit 10 into the settling pit 11 where the ash and dirt settle out. The supernatant sulfur is pumped from the pit by the pump 12 and passes thru the pipe 13 to the head of the sloping hearth where it feeds out onto the hearth at one or more places, as for example from the open nozzle 14.

Solid, raw sulfur is also fed to the head of the sloping hearth 6 thru the opening 15 in the rear wall 16 of the furnace. Any suitable feed mechanism such as a hopper and screw (not shown) may be used. The rate of feed of solid sulfur is regulated by means of a suitable variable speed feed mechanism (not shown) which is actuated by the float 17 in the settling pit 11. This makes it possible automatically to regulate the solid sulfur feed as required to compensate for sulfur vaporized in the passage of the high-temperaturefluent sulfur down the sloping hearth 6. Automatic control of this character coupled with automatic control of admission of air to one or the other or both of the primary air port 13 or the secondary air port 18a by means of a suitable sulfur dioxide analyzer makes the entire operation automatic and continuous, a result which could not be accomplished in the conventional type pan burner due to incrustations on the molten body of sulfur and accumulation of dirt and ash.

The settling pit 11, as more particularly illustrated in Figure 3 supplemented by Figures 2 and 4, is a generally rectangular pit provided with an inclined wall 19 up which dirt and ash may be raked by either manual or mechanical means into the clean-out box 20. The side walls 21 and 22 of the pit taper inwardly about half way up the sloping wall 19, as shown at 23, in order to facilitate the raking out of dirt and ash into the clean-out box 20. The conduit 10 feeds into the settling pit, as shown at 24, below the level of liquid sulfur therein, the purpose being to extinguish the flames on the surface of the flowing sulfur. The walls 25 and 26 serve as baffles to direct the molten sulfur newly introduced towards the bottom of the pit, to reduce the burning of the sulfur in the pit, and to guide the float. The float 17 is located in the compartment defined by partitions 25 and 26, but any other suitable location will suffice. The pump 12 is located in the compartment defined by partition 26 and the end wall 27 of the settling pit. Any suitable pump or vapor lift may be employed provided the intake is located well above the bottom of the pit.

The top of the settling pit is provided with a tight cover 28 so as to exclude air and minimize the amount of burning in the pit. The cover extends over the entire top of the settling pit and is so shaped as to provide a hood 37 which communicates with the opening 9 in the furnace and to form part of the clean-out box 20.

The clean-out box 20 forms an extension around the clean-out end 29. It is composed of a top wall 30, a bottom 31, a front wall 32, and two side walls 33 and 34. The other wall is provided by the inclined wall 19 of the settling pit. The upper corner of the clean-out box 20 is cut away and provided with a removable closure 35. The cutout is so located that when the cover is removed the opening in the clean-out box is opposite the clean-out end 29 so that a rake or hoe may be introduced into the cleaning pit for the removal of dirt and ash which has settled to the bottom. As this dirt and ash is raked out into the clean-out box 20 it contains appreciable amounts of sulfur. This is burned in the clean-out box by air admitted thru the ports 36 in the side walls. The sulfur vapors and sulfur dioxide thus formed along with the sulfur vapor and sulfur dioxide which emanate from the pit pass up under the hood 37 and thru the opening 9 into the burner. The front end of the hood 37 is fitted with a door 38 which may be removed for inspection of the hearth 6. The door 38 is provided with a small air port 39 so that air is drawn in thru the hood and sweeps the sulfur dioxide and sulfur vapors passing up from the clean-out box and settling pit into the burner. In this manner all the sulfur value is recovered. The clean-out box also is provided with an opening 40 and the hinged closure 41 in order that the burned out residue may be removed.

In operation the settling pit provides a very efficient way of separating impurities from the high-temperature-fluent sulfur. Two factors contribute to this result. In the first place, the settling pit operates on high-temperature-fluent sulfur whereas in the prior art use of settling pits the sulfur has uniformly been low-temperature-fluent sulfur. In the second place, in its passage thru the vaporization zone the high-temperature-fluent sulfur becomes relatively concentrated with respect to the impurities in the degree that the sulfur is vaporized and the impurities are not.

In operation of the burner the draft is created by means of a blower in the sulfur dioxide line. Air therefore is drawn into the burner thru the various air ports provided. The air for primary combustion is regulated by varying the size of the air port 18. Additional air may be admitted into the combustion chamber 2. Secondary air is admitted thru a suitable port 18a and, depending upon the location of the port, may act mainly as a diluent or may contribute to the combustion of the sulfur vapor. We find that it is most generally desirable to manually adjust the primary air as required for satisfactory operation of the burner and to automatically adjust the secondary air as required to maintain a constant sulfur dioxide content in the sulfur dioxide gas. Automatic sulfur dioxide recorder controllers are available on the market and may be made to operate a suitable damper for the air port 18a according to standard practices in the art.

In a modified form of the invention, as illustrated in Figure 5, there is provided a partition 42 which separates the dry sulfur fed to the hearth from the high-temperature-fluent sulfur fed to the hearth by the nozzle 14. The purpose of partition 42 is to permit the solid sulfur to melt before it enters the stream of recirculated sulfur, otherwise some lumps may be carried thru the burner before they are completely melted. A similar modification is illustrated in Figure 6 where partitions 43 and 44 isolate the dry sulfur feed from the high-temperature-fluent sulfur feed to the hearth thru the nozzles 14.

Still a further modification is illustrated in Figure 7. In this modification the high-temperature-fluent sulfur instead of being recirculated to the upper end of the hearth is passed into a melting pit 45 provided with a hopper and screw feed mechanism 46 for feeding solid sulfur. The heat content of the high-temperature-fluent sulfur is thus utilized to melt the sulfur. The melting pit 45 communicates with the hearth 47 thru the opening 48 in the back wall 49 of the burner so that the overflow of the melting pit, which is high-temperature-fluent sulfur augmented by the sulfur which is melted in the pit, passes into the vaporizing zone. The sloping hearth 47 is also provided with converging walls 50 and 51 which act progressively to diminish the hearth area as the sulfur flows down toward the outlet 52. The outlet 52 feeds into a settling pit (not shown) which, if desired, may be constructed as illustrated in Figures 2, 3 and 4.

In the modification shown in Figure 7 it is not required that the settling pit have such large capacity because a substantial amount of sedimentation of ash and dirt is effected in the melting pit 45. As the outlet 48 of the melting pit 45 is arranged to take the overflow, the floating carbonaceous material will pass into the burner and is eventually separated in the settling pit. By suitable construction the two pits can be made to divide the load of residue in any desired manner.

Molten sulfur exists in several allotropic forms which result in very marked modification of the viscosity of the molten sulfur at different temperatures. Thus at temperatures between the melting point and up to about 350° F. the molten sulfur is fluent. As the temperature is raised the sulfur becomes very viscous. For example, between a temperature of about 300 and about 350° F. the viscosity changes sharply from about 0.1 poise to about 560 poises. At a temperature of 700° F. the viscosity drops back to about three poises, and at 800° F. to about one poise. Thus molten sulfur exists in two fluent states and one viscous state. We speak of "high-temperature-fluent sulfur" with reference to the fluent state near the boiling point and in contradistinction to the fluent state near the melting point.

When dry sulfur is fed to the hearth 6 it passes thru the low-temperature-fluent state, the viscous state and the high-temperature-fluent state. In the modification shown in Figures 1 and 2 low-temperature-fluent sulfur flows away from a pile of dry sulfur which accumulates at the upper end of the hearth under the feed opening 15. This low-temperature-fluent sulfur rapidly co-mingles with the recirculated high-temperature-fluent sulfur and becomes heated by contact therewith and also by the heat of combustion. The ratio of high-temperature-fluent sulfur is maintained large enough so that the viscous form thru which the latter passes on being heated does not deleteriously affect the operation of the burner.

This ratio is also maintained large enough that the flow is sufficient to prevent accumulation of dirt, ash and undesirable residue upon the hearth. When feeding very dirty sulfur the ratio must obviously be greater than with clean sulfur. If an external source of heat is employed to melt the sulfur, as for example steam from a waste heat boiler in the sulfur dioxide line, some of the dirt may be settled from the sulfur before it enters the burner and the ratio recirculated can be reduced. We have found a ratio of about 10 to 1 to be satisfactory with a solid sulfur feed. However, the ratio required may vary widely with conditions.

In the modification shown in Figure 5 the partition 42 separates the low-temperature-fluent sulfur from the high-temperature-fluent sulfur. The low-temperature-fluent sulfur flows down along the partition 42 and out thru the opening between the ends of this partition and the wall 7. As it continues to flow it passes thru the viscous state. This causes it to dam up and fan out over the hearth 6 and thus to co-mingle with the high-temperature-fluent sulfur flowing down the hearth. If desired, means may be provided for keeping the low-temperature-fluent sulfur isolated until it has passed thru the viscous state so that the co-mingling with the recycled high-temperature-fluent sulfur takes place after the low-temperature-fluent sulfur has reached the high-temperature-fluent state. Such co-mingling may be effected either in the hearth or in the settling pit.

If the heat content of the high-temperature-fluent sulfur recycled is utilized to melt the raw sulfur, as for example in the modification of Figure 7, the recycled sulfur as well as the proportion of recycled sulfur to raw sulfur should be maintained sufficiently high in order that the cooling effect of melting the raw sulfur will not reduce the temperature of the liquid to the viscous range. Thus in the modification illustrated in Figure 7 the temperature of the recycled molten sulfur should be maintained above about 700° F. and the ratio of recycled high-temperature-fluent sulfur to raw sulfur feed should be at least about 10 to 1. As in the other forms of our invention these conditions will automatically adjust themselves in operation according to the capacity and design of the particular furnace involved.

While we have described particular apparatus for carrying out the processes of our invention it will be understood that other types of apparatus may be used, as long as it includes a vaporization zone and means for continuously circulating high-temperature-fluent sulphur thru such a zone, or is of such design that residue and impurities introduced with the raw sulfur feed are continuously swept from the volatilization zone by high-temperature-fluent sulfur flowing therethru to a point external where they may be separated in suitable mechanism for separating impurities from molten sulfur. In such apparatus the area required for burning a given amount of sulfur is considerably less than in the usual pan type burners, the formation of sublimed sulfur thruout the system on shut-downs is avoided, fluctuations in sulfur dioxide content of the gases due to incrustations forming on the surface of molten sulfur is avoided and simple and effective continuous, and automatic if desired, operation is possible.

We claim:

1. In the manufacture of sulfur dioxide by the vaporization of sulfur and the combustion of sulfur vapor the steps of continuously causing fluent sulfur to flow down a flat sloping surface having sides converging to an outlet, continuously vaporizing sulfur from said fluent sulfur in its passage down said sloping surface, continuously burning said sulfur vapor in proximity to said fluent sulfur passing down said sloping surface, continuously withdrawing fluent sulfur from said outlet into a settling pit, permitting the sulfur to settle, withdrawing supernatant sulfur from said pit and returning it as said first-named fluent sulfur and introducing raw sulfur as required to maintain a substantially constant level of sulfur in said settling pit.

2. In the manufacture of sulfur dioxide by the vaporization of sulfur and combustion of sulfur vapor the steps of continuously causing high-temperature-fluent sulfur to flow bodily through a vaporizing chamber heated sufficiently to vaporize sulfur, the rate of flow being such that only a portion of the sulfur is vaporized and continuous passage of fluent sulfur through said chamber acts to sweep impurities from the chamber, separating at least a portion of the impurities thus swept out of the vaporizing chamber from the high-temperature-fluent sulfur and returning the thus purified high-temperature-fluent sulfur to the vaporizing chamber, and adding raw sulfur as required to replenish the sulfur vaporized in the vaporizing chamber.

3. In the manufacture of sulfur dioxide by the vaporization of sulfur and combustion of sulphur vapor the steps of continuously passing high-temperature-fluent sulfur through a vaporizing zone, continuously withdrawing high-temperature-fluent sulfur into a non-vaporizing zone, continuously returning high-temperature-fluent sulfur to the vaporizing zone, continuously passing an oxygen-containing gas through the vaporizing zone countercurrent to the flow of sulfur therein, burning the mixture of sulfur vapor and oxygen thus obtained in proximity to the sulfur passing through the vaporizing zone and introducing raw sulfur as required to maintain the quantity of high-temperature-fluent sulfur in circulation substantially constant.

4. In the manufacture of sulfur dioxide by the vaporization of sulfur and the combustion of sulfur vapor the steps of continuously causing fluent sulfur to flow down a flat sloping surface having sides converging to an outlet, continuously vaporizing sulfur from said fluent sulfur in passage down said sloping surface, continuously withdrawing fluent sulfur from said outlet, effecting at least partial separation of impurities from the sulfur thus withdrawn and returning it to the process, and introducing raw sulfur as required to maintain the quantity of high-temperature-fluent sulfur in circulation substantially constant.

5. In the manufacture of sulfur dioxide by the vaporization of sulfur and the combustion of sulfur vapor the steps of continuously causing fluent sulfur to flow down a flat sloping surface having sides converging to an outlet, continuously vaporizing sulfur from said fluent sulfur in passage down said sloping surface, continuously withdrawing fluent sulfur from said outlet, effecting at least partial separation of impurities from the sulfur thus withdrawn, commingling the thus purified high-temperature-fluent sulfur with raw sulfur and returning the product thus obtained as said first-named fluent sulfur.

6. In the manufacture of sulfur dioxide by the vaporization of sulfur and the combustion of sulfur vapor the step of continuously causing fluent sulfur to flow down a flat sloping surface having sides converging to an outlet, continuously vaporizing sulfur from said fluent sulfur in passage down said sloping surface, continuously withdrawing fluent sulfur from said outlet, effecting at least partial separation of impurities from the sulfur thus withdrawn, introducing the thus purified sulfur adjacent the top of said sloping surface and independently thereof introducing raw sulfur adjacent the top of said sloping surface as required to maintain a substantially constant volume of sulfur in the circulation.

7. In the manufacture of sulfur dioxide by the vaporization of sulfur and the combustion of sulfur vapor the steps of continuously causing fluent sulfur to pass through a vaporizing chamber in a shallow stream of width diminishing progressively to an outlet, continuously vaporizing sulfur from said fluent sulfur in its passage through said vaporizing chamber, continuously withdrawing fluent sulfur from said outlet into a settling pit, causing solid impurities to settle out of the fluent sulfur in said settling pit, and then recirculating the supernatant sulfur through the vaporizing chamber.

8. In the manufacture of sulfur dioxide by the vaporization of sulfur and the combustion of sulfur vapor the steps of continuously causing a stream of high-temperature-fluent sulfur to flow through a vaporizing chamber as a substantially unitary mass, vaporizing sulfur from said high-temperature-fluent sulfur during its passage through said vaporizing chamber, separating impurities from the high-temperature-fluent sulfur which has passed through the vaporizing chamber, returning the so-purified sulfur to the vaporizing chamber, and introducing raw sulfur substantially at the rate sulfur is vaporized in said vaporizing chamber.

9. In the manufacture of sulfur dioxide by vaporization of sulfur and combustion of sulfur vapor the steps of continuously causing fluent sulfur to flow through a vaporizing chamber in a stream converging to an outlet, continuously withdrawing fluent sulfur from said outlet into a settling pit, permitting impurities in the high-temperature-fluent sulfur to settle out in said settling pit as required to provide a relatively pure supernatant layer of sulfur, continuously withdrawing the supernatant sulfur from said settling pit while it is still in the high-temperature-fluent state and introducing it into said vaporizing chamber substantially at the same rate that the high-temperature-fluent sulfur is withdrawn from said vaporizing chamber, heating the high-temperature-fluent sulfur in said chamber to cause vaporization of sulfur, and introducing raw sulfur into said chamber at a rate substantially equivalent to the rate at which sulfur is vaporized in said chamber.

WORTHINGTON T. GRACE.
JOSEPH C. MULLER, Jr.

REFERENCES CITED

The following references are of record in the file of this patent:

UNITED STATES PATENTS

| Number | Name | Date |
|---|---|---|
| 572,193 | Coker | Dec. 1, 1896 |
| 906,574 | Stebbins | Dec. 15, 1908 |
| 911,735 | Lyman | Feb. 9, 1909 |
| 1,303,348 | McIntyre | May 13, 1919 |
| 1,422,801 | Wells | July 11, 1922 |
| 1,450,677 | Chickering | Apr. 3, 1923 |
| 1,476,523 | Kerr | Dec. 4, 1923 |
| 1,590,622 | Hechenbleikner | June 29, 1926 |
| 1,595,196 | Isinberg | Aug. 20, 1926 |
| 1,657,545 | Merriam | Jan. 31, 1928 |
| 1,714,657 | Buse | May 28, 1929 |
| 1,812,795 | Leahy | June 30, 1931 |
| 1,928,099 | Gillett | Sept. 26, 1933 |
| 2,071,534 | Ingraham | Feb. 23, 1937 |

FOREIGN PATENTS

| Number | Country | Date |
|---|---|---|
| 205,224 | Great Britain | Oct. 18, 1923 |